(12) United States Patent
Mauceri, Jr. et al.

(10) Patent No.: US 7,461,340 B1
(45) Date of Patent: Dec. 2, 2008

(54) INTEGRATED DECORATIVE PANELS

(75) Inventors: Robert J. Mauceri, Jr., Seattle, WA (US); Charles Y. Bissonnette, Snoqualmie, WA (US); Aaron S. Filner, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 173 days.

(21) Appl. No.: 10/631,119

(22) Filed: Jul. 31, 2003

(51) Int. Cl.
*G06F 17/00* (2006.01)

(52) U.S. Cl. .................. 715/243; 715/244; 715/245; 715/246; 715/247; 715/252

(58) Field of Classification Search ............ 715/513, 715/517, 509, 243, 244, 245, 246, 247, 252; 707/102; 345/440
See application file for complete search history.

(56) References Cited

U.S. PATENT DOCUMENTS

| | | | |
|---|---|---|---|
| 5,450,536 A | 9/1995 | Rosenberg et al. | 395/148 |
| 6,613,099 B2* | 9/2003 | Crim | 715/210 |
| 7,051,084 B1* | 5/2006 | Hayton et al. | 709/219 |
| 7,278,098 B1* | 10/2007 | Boye et al. | 715/210 |
| 2004/0119713 A1* | 6/2004 | Meyringer | 345/440 |
| 2004/0148307 A1* | 7/2004 | Rempell | 707/102 |
| 2004/0255244 A1* | 12/2004 | Filner et al. | 715/517 |

FOREIGN PATENT DOCUMENTS

WO    WO 01/98928 A2    12/2001

OTHER PUBLICATIONS

Teague, Jason Cranford "DHTML and CSS for the word wide web", Public Release May 22, 2001—By Peach Pit Press, USA- pp. 167-202.*
Teague, Jason Cranford "DHTML and CSS for the word wide web", Public Release May 22, 2001—By Peach Pit Press, USA- pp. 114-140 and 167-202.*
Conway, Stuart, et al. 2001. "CSS Positioning and Packaging." *HTML 4.01 Programmer's Reference.* Wrox Press Ltd., UK. 13:341-369 and 21:562.

* cited by examiner

*Primary Examiner*—Matthew J. Ludwig
(74) *Attorney, Agent, or Firm*—Workman Nydegger

(57) ABSTRACT

Table elements, such as HTML elements, are automatically formatted relative to a change in visual appearance of a displayed decorative panel. The decorative panel comprises a plurality of separate but visually related regions defined by the table elements, and organized in predefined logical relationships to each other. A visual change causes an automatic revision to one or more attributes of the table elements that define the regions affected by the visual change. The visual change and automatic formatting are preferably accomplished with a Web page design tool, which identifies the decorative panel from comments associated with the table elements but do not affect rendering by a conventional browser. Visual properties of the decorative panel are mapped to the attributes, so that when the visual appearance is changed, a corresponding attribute is automatically revised. The resulting revised table elements are validated against predetermined inference rules that define valid patterns of regions.

12 Claims, 10 Drawing Sheets

INTEGRATED DECORATIVE PANELS

FIELD OF THE INVENTION

The present invention generally relates to a method and system to automatically format a table of cells, and more specifically, pertains to automatically formatting a table of cells that are integrated by visual relationships to define a decorative panel.

BACKGROUND OF THE INVENTION

Hypertext Markup Language (HTML) tables and other software tables are often used to display a matrix of alphanumeric data, such as product identifiers, quantities, and prices. However, HTML tables and other software tables are also often used for page layout structures to create a decorative box or other shape that simply enhances the appearance of other text or other content. In this latter case, cells of the table can be arranged to display a colored border, a shadow, or other format decoration. These decorations usually appear to be cohesive units. For example, a colored border appears to be a single box around some inner content data. However, the colored border is typically just a set of separate table cells that are assigned the same fill color. The dimensions and locations of each separate table cell are defined and arranged in logical relation to each other so that they appear as a single border when rendered in a browser display. Although the ability to specify parameters for the individual cells provides a Web designer with fine control over such decorations, building and revising decorative tables of this type can be very time consuming, tedious, and/or complex.

To better understand the complexity, consider an HTML <table> element that includes some. HTML elements that are often used for formatting, like <Cell> and <Img>. Currently, the visual effect of these elements cannot be dynamically altered in a consistent manner while editing with a graphical user interface (GUI) to perform resizing or other intuitive graphical operations on table cell elements. Instead, these standard HTML attributes must be revised independently. An HTML <table> element also includes attributes for dividing a table into logical components, such as a header (<thead>), a footer (<tfoot>), a body (<tbody>), and a group specified by the above three attributes within a <rules> attribute. However, these logical elements also cannot be dynamically altered for all appropriate table cell elements during resizing or other intuitive graphical operations. Revising one attribute does not necessarily cause a revision to other cells in a table. These limitations increase the time, effort, and skill required to create and revise decorative tables (which are sometimes referred to as "layout tables").

It would clearly be desirable to associate logically related cells of a table used for decorative formatting, and to provide an intuitive graphical tool for creating and revising such tables as a whole, rather than modifying each individual cell. It would also be desirable to ensure that cells of a decoratively formatted table are sufficiently well defined so as not to exceed the capabilities of the intuitive graphical tool, which could lead to an unsatisfactory experience by a user of the tool.

SUMMARY OF THE INVENTION

The present invention is directed to a method and system for automatically formatting table elements relative to a change in visual appearance of a displayed decorative panel so that all visually related regions of the decorative panel are changed consistently. The decorative panel comprises a plurality of separate but visually related regions that are defined by the table elements, and which are organized in predefined logical relationships to each other. The table elements are formatted as a function of at least one element attribute corresponding to a visual property of the visually related regions that are affected by the change in the visual appearance of the decorative panel. The visual appearance of the decorative panel is a composite of a number of properties that are associated with at least one element attribute of at least one table element, or are applied as images contained within a table element. Thus, when a change in the visual appearance is detected, a revision to one or more of the attributes or images is determined and automatically applied to those table elements and images that define the visually related regions of the decorative panel that were affected by the change in the visual appearance of the decorative panel.

To ensure that the change does not violate any predefined logical relationships among the visually related regions and possibly lead to unpredictable affects on the underlying table elements, the revised table elements are evaluated against a predetermined set of inference rules. The inference rules define a plurality of patterns into which one or more of the visually related regions can be arranged. If the change to the decorative panel yields a revised table that conforms to one of the patterns, the table elements will provide a reliable visual appearance of the decorative panel. However, if the revised table does not conform to one of the patterns, the revised table is marked as no longer defining a decorative panel recognized by this invention. In that case, only conventional editing functions can be performed on the revised table, such as those performed by a prior art design tool.

Preferably, a user changes the visual appearance of the decorative panel with a GUI, such as that provided in a design tool for creating and modifying Web pages. Accordingly, the decorative panel is preferably defined by an HTML table that can be rendered with a conventional browser. To identify the table as one that defines a decorative panel, without requiring nonstandard table elements, inert comments (i.e., comments that are not executable and which are ignored by a conventional browser) are included near the table elements. Changes in the visual appearance of the decorative panel can include resizing the decorative panel, adding a region to the decorative panel, deleting a region from the decorative panel, relocating a region within the decorative panel, resizing a region of the decorative panel, revising a visual characteristic of a region of the decorative panel, and other visually intuitive changes. Changes to the visual appearance are preferably propagated to the table elements by mapping the visual properties to the table elements. A database stores values of visual properties in a hierarchical structure that defines relationships between the visual properties. The visual properties may comprise location, size, color, and other characteristics of the visual regions of the decorative panel. The visual properties are mapped to attributes of the table elements, so that when a visual property is changed, a corresponding attribute is automatically revised. Automatically revising values of the mapped attributes results in automatically formatting the table elements relative to the change in visual appearance of the decorative panel.

Another aspect of the invention is directed to a memory medium storing machine instructions that cause a processor to perform the steps described above and discussed in further detail below.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

Figure 3A:
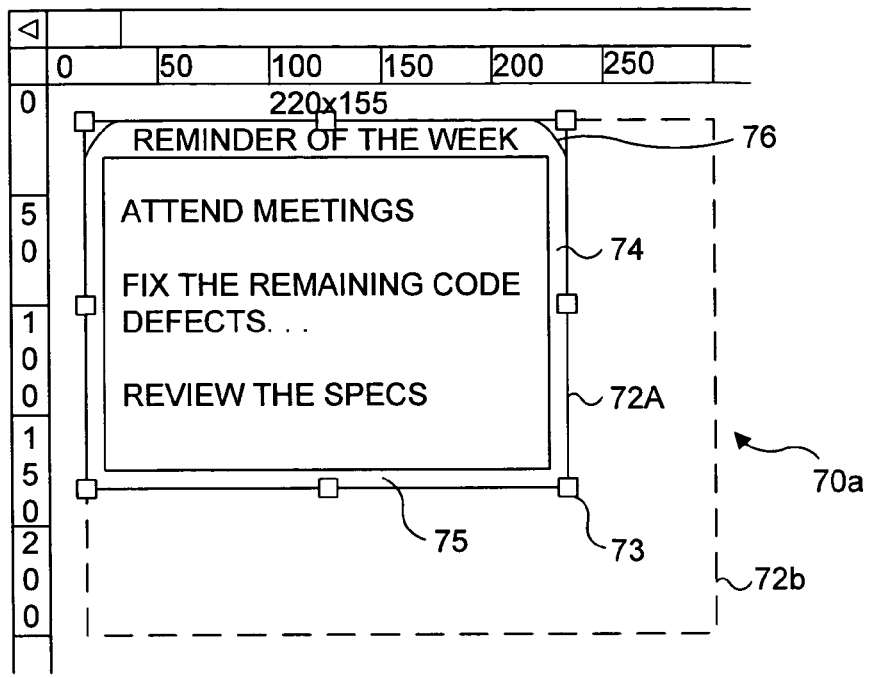
Figure 3B:
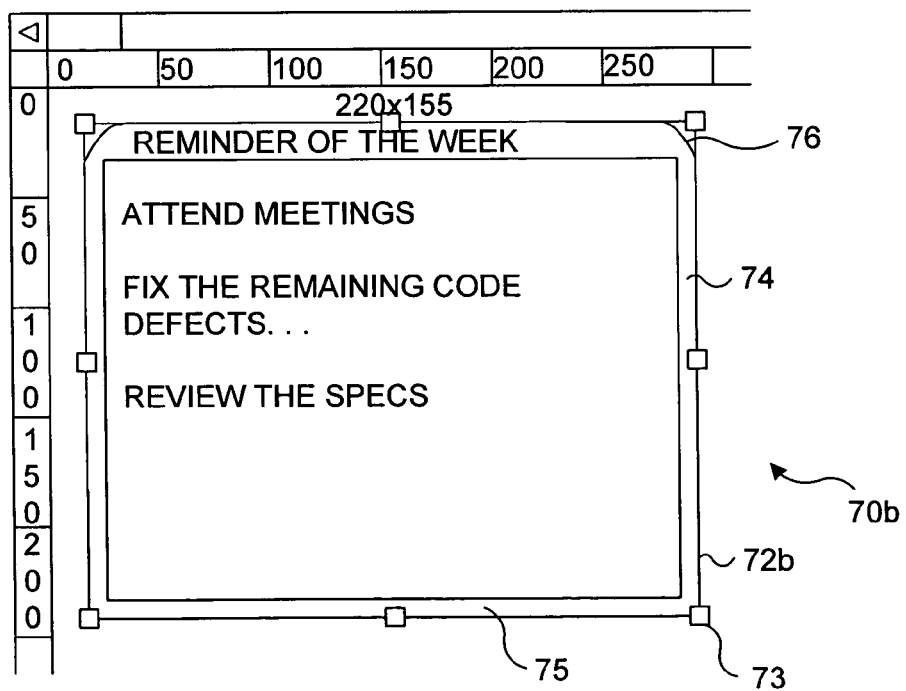
Figure 4:
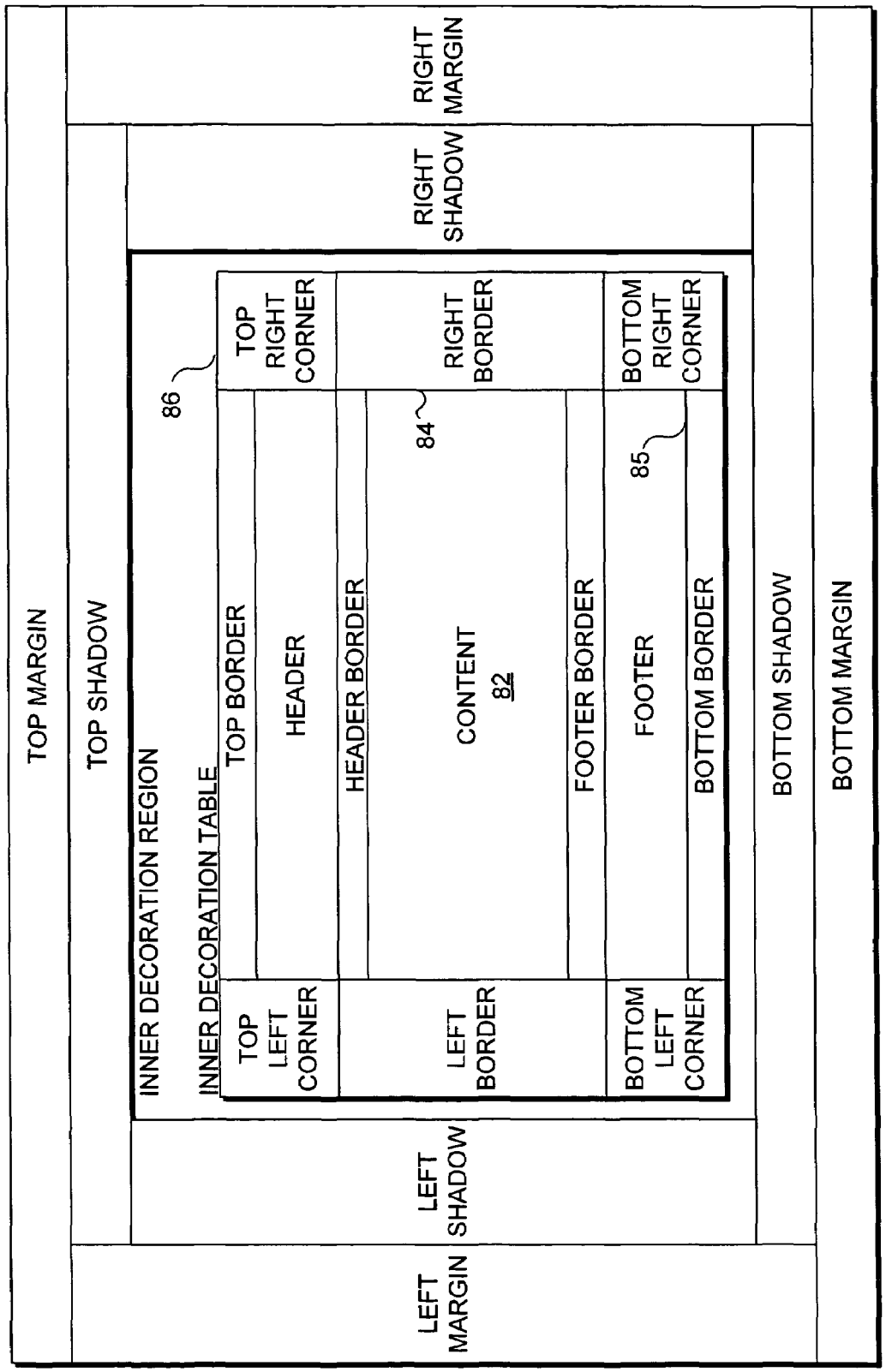
Figure 5:
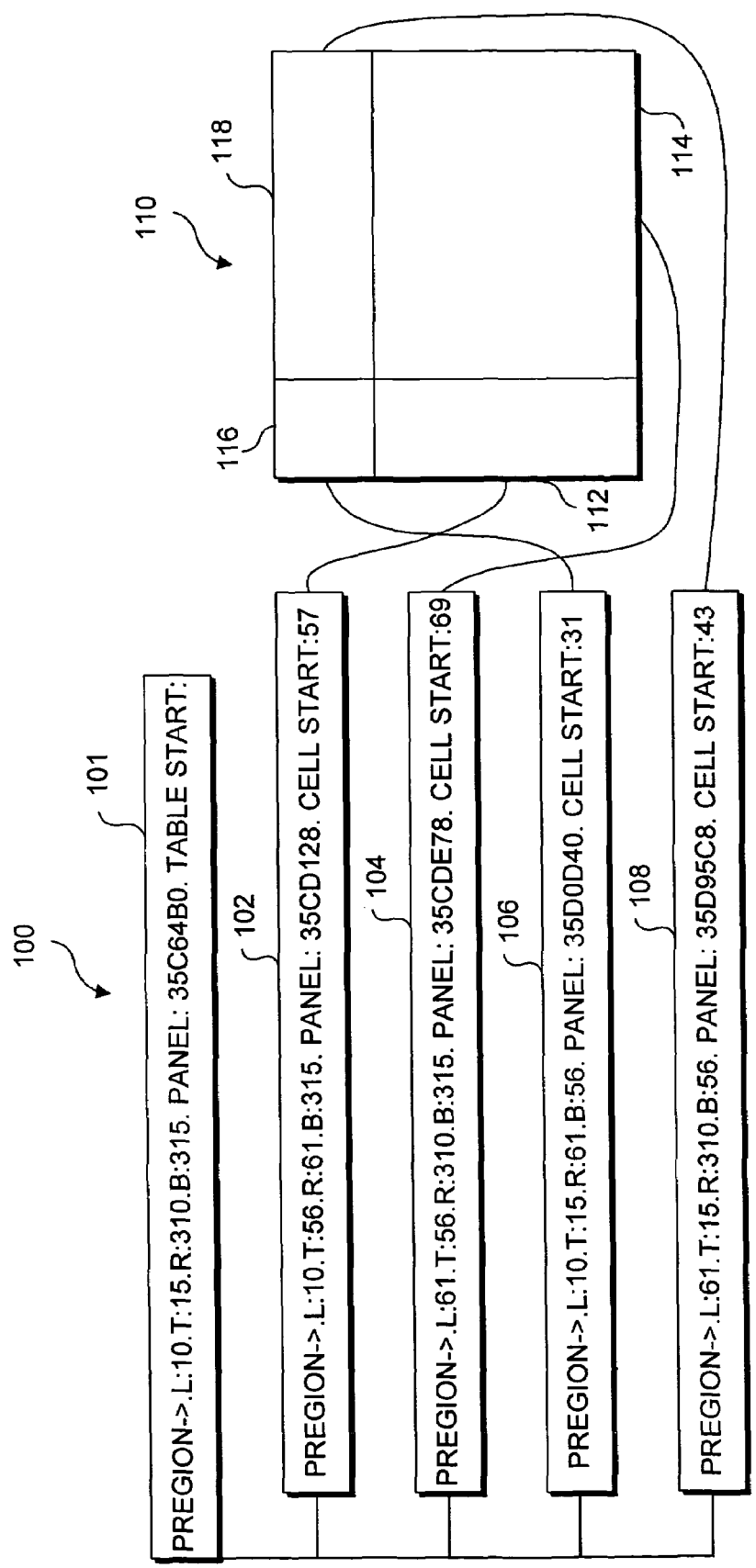
Figure 6:
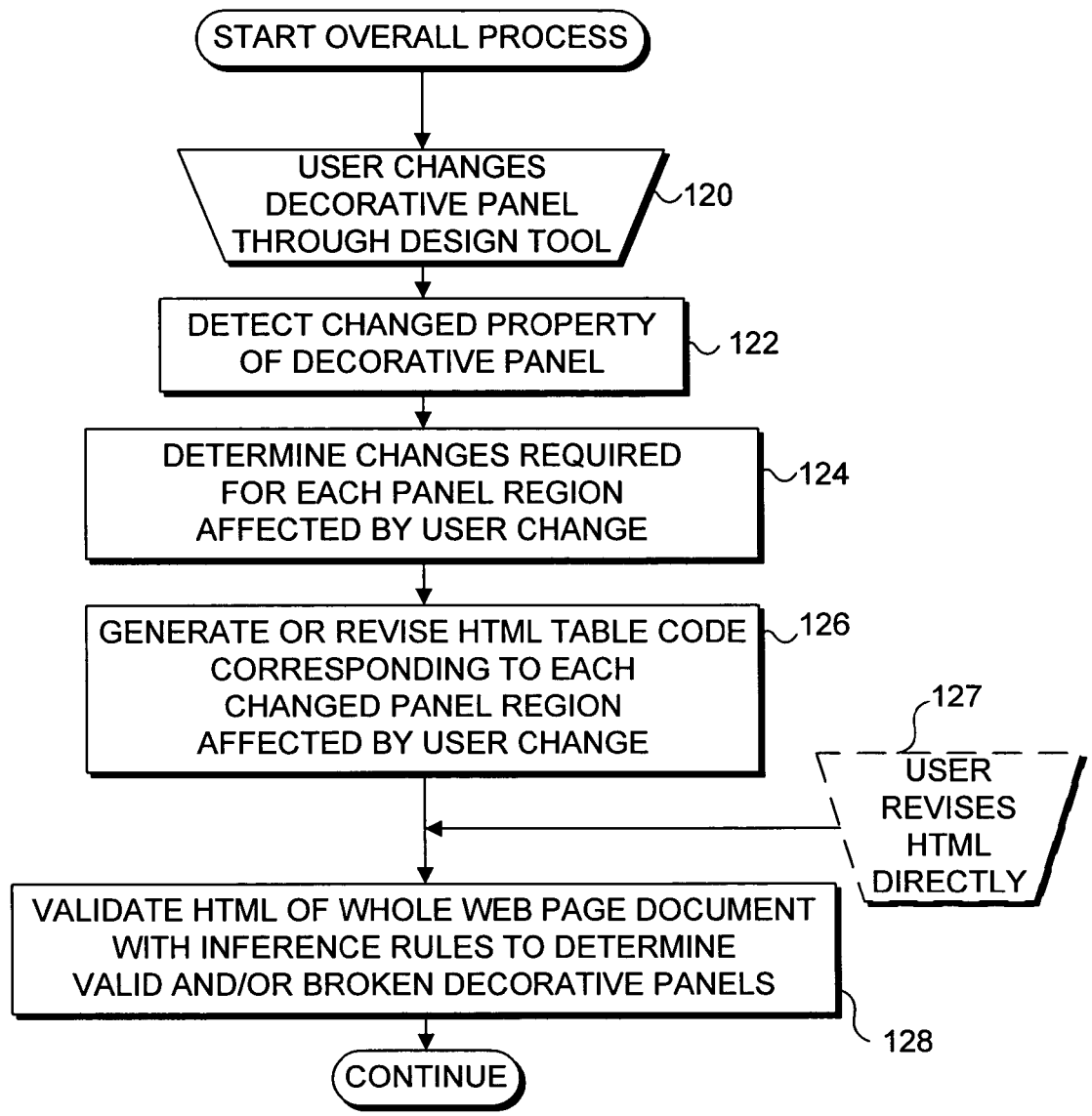
Figure 7:
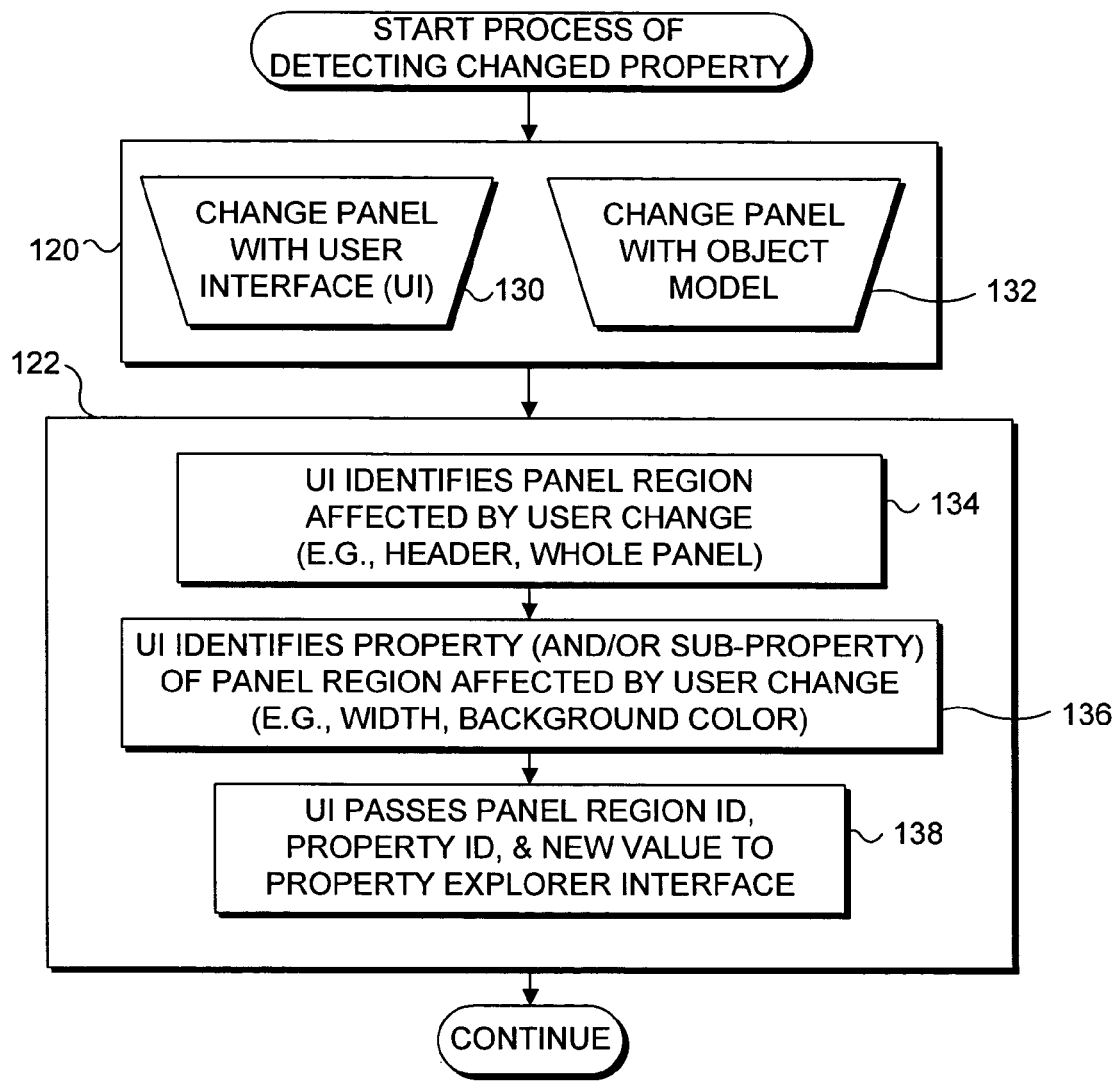
Figure 8:
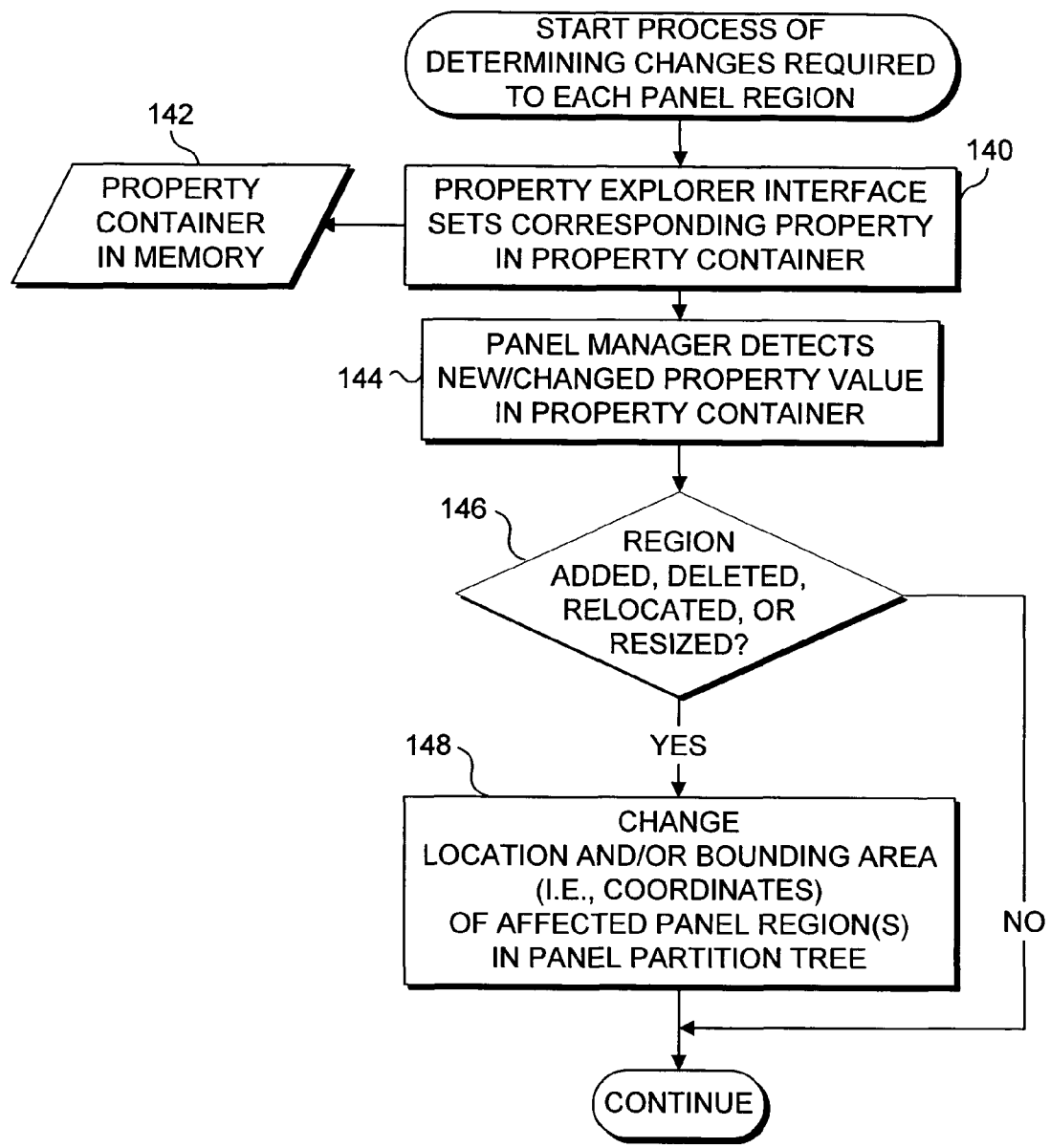
Figure 9:
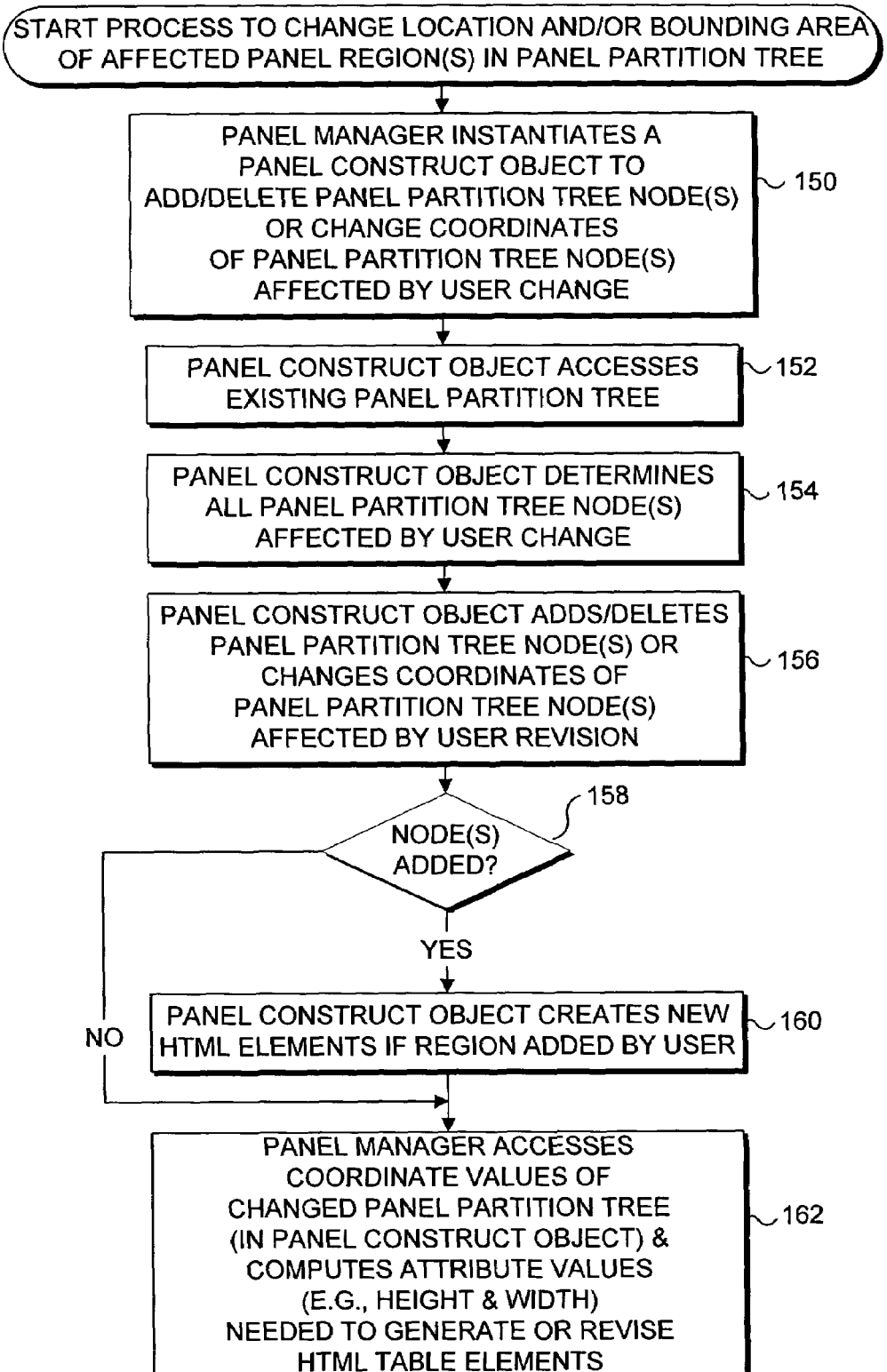
Figure 10:
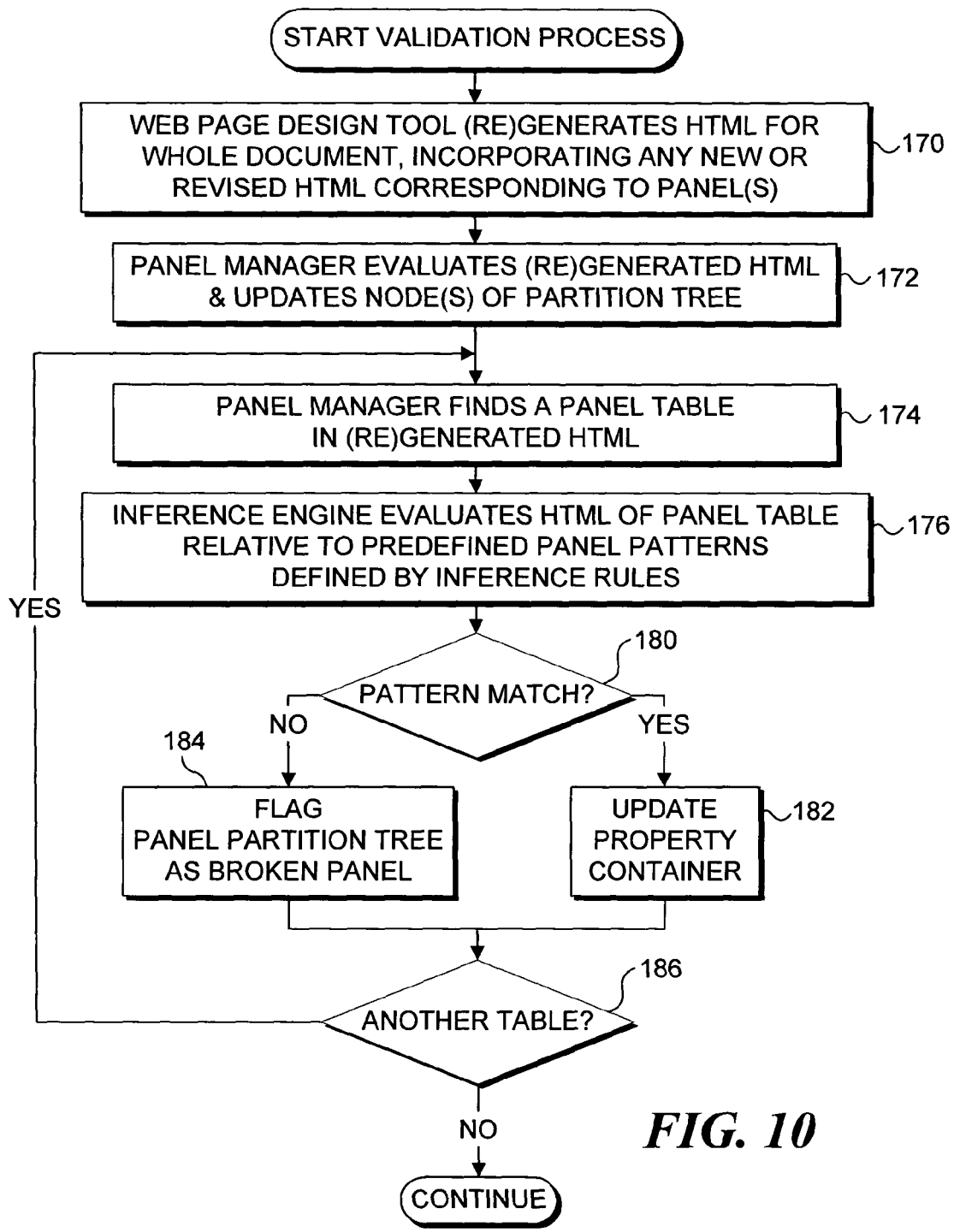

FIG. 3A provides a partial screen shot of a Web page design tool incorporating a preferred embodiment of the present invention and showing an originally sized decorative panel that is in the process of being resized;

FIG. 3B is a partial screen shot of the inventive Web page design tool, illustrating a resized decorative panel that maintains its visual integration as a result of relationships among visual regions that correspond to individual table cells;

FIG. 4 is a structure diagram illustrating a preferred predefined logical structure of a decorative panel;

FIG. 5 illustrates a mapping between a sample panel partition tree and a sample decorative panel;

FIG. 6 is a flow diagram illustrating the overall logic employed by a Web page design tool to format an HTML table of a Web document in response to a user changing a corresponding decorative panel;

FIG. 7 is a flow diagram illustrating the logic for detecting a changed property of the decorative panel;

FIG. 8 is a flow diagram illustrating the logic for determining changes required to a property container and partition tree for each panel region that is affected by the user's change;

FIG. 9 is a flow diagram illustrating the logic for changing the coordinates in the partition tree defining a location and bounding area of a changed region or of the entire decorative panel; and FIG. 10 is a flow diagram illustrating the logic for validating tables of a Web document.

DESCRIPTION OF THE PREFERRED EMBODIMENT

Computing Environment

Figure 1:
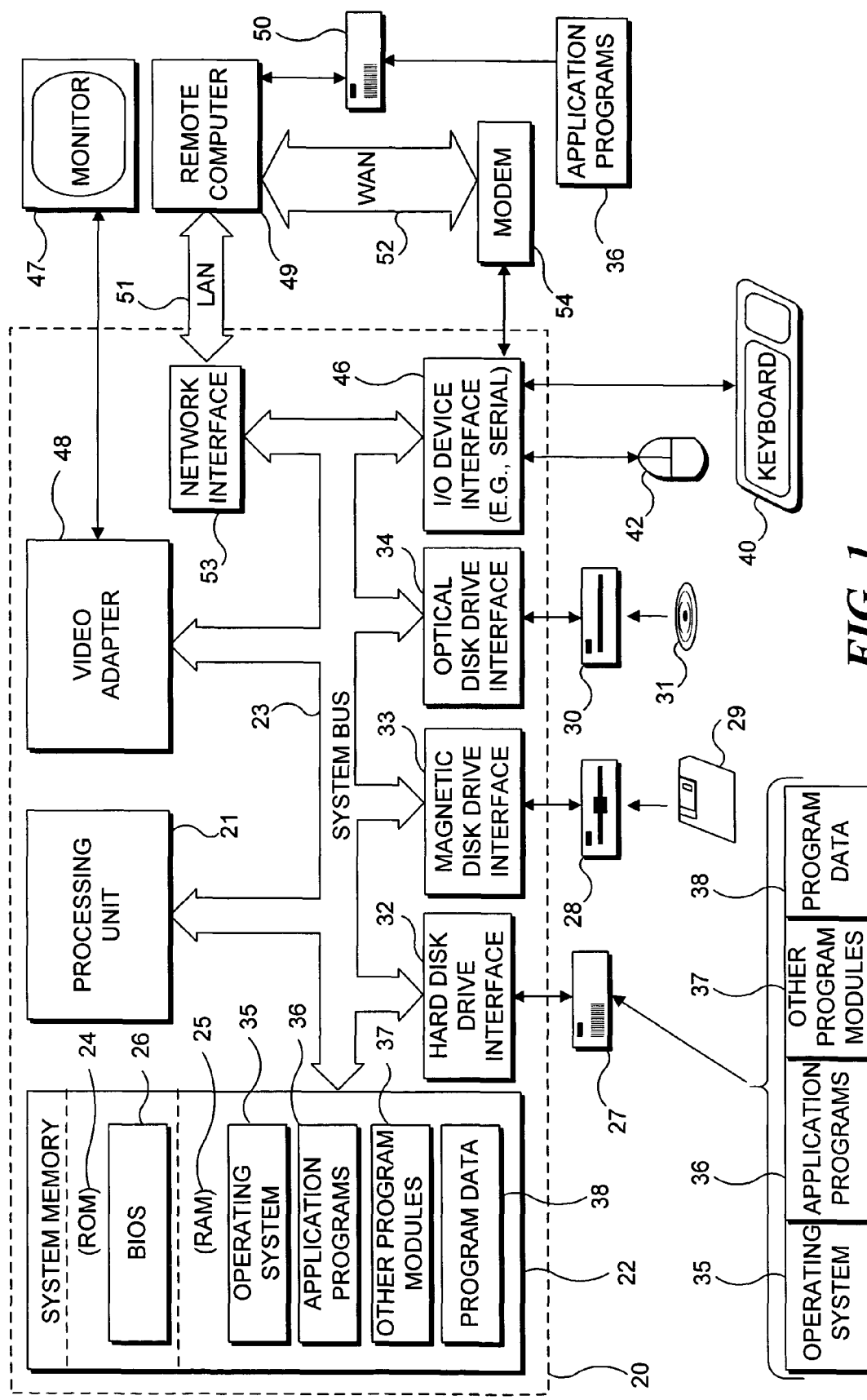
FIG. 1 is a functional block diagram illustrating an exemplary computing system for use with the present invention and includes a general purpose computing device in the form of a conventional personal computer (PC)

FIG. 1 and the following discussion are intended to provide a brief, general description of a suitable computing environment in which the present invention may be implemented. Although not required, the present invention will be described in the general context of computer executable instructions, such as program modules, which are executed by a personal computer. Generally, program modules include routines, programs, objects, components, data structures, etc. that perform particular tasks or implement particular abstract data types. A preferred embodiment is described below in the context of a program for developing Web sites, such as Microsoft Corporation's MICROSOFT OFFICE FRONTPAGE™ software package, which is executed on a PC. However, those skilled in the art will appreciate that the present invention may be practiced with other programs, such as spreadsheet programs or word processors, which can also provide visual decorations by formatting cells of tabular data structures. Those skilled in the art will also appreciate that the present invention may be practiced with other computer system configurations, including hand held devices, multiprocessor systems, microprocessor based or programmable consumer electronic devices, network personal computers, minicomputers, mainframe computers, and the like. The present invention may also be practiced in distributed computing environments, where tasks are performed by remote processing devices that are linked through a communications network. In a distributed computing environment, program modules may be located in both local and remote memory storage devices.

With reference to FIG. 1, an exemplary system for implementing the present invention includes a general purpose computing device in the form of a conventional personal computer 20, provided with a processing unit 21, a system memory 22, and a system bus 23. The system bus couples various system components including the system memory to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that helps to transfer information between elements within personal computer 20, such as during start up, is stored in ROM 24. Personal computer 20 further includes a hard disk drive 27 for reading from and writing to a hard disk, not shown, a magnetic disk drive 28 for reading from or writing to a removable magnetic disk 29, and an optical disc drive 30 for reading from or writing to a removable optical disc 31, such as a CDROM or other optical media. Hard disk drive 27, magnetic disk drive 28, and optical disc drive 30 are connected to system bus 23 by a hard disk drive interface 32, a magnetic disk drive interface 33, and an optical disc drive interface 34, respectively. The drives and their associated computer readable media provide nonvolatile storage of computer readable machine instructions, data structures, program modules and other data for personal computer 20. Although the exemplary environment described herein employs a hard disk, removable magnetic disk 29, and removable optical disc 31, it will be appreciated by those skilled in the art that other types of computer readable media, which can store data that are accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disc 31, ROM 24 or RAM 25, including an operating system 35, one or more application programs 36, other program modules 37, and program data 38. A user may enter commands and information into personal computer 20 through input devices such as a keyboard 40 and a pointing device 42. Other input devices (not shown) may include a microphone, joystick, game pad, satellite dish, scanner, or the like. These and other input devices are often connected to processing unit 21 through an input/output (I/O) interface 46 that is coupled to the system bus. The term I/O interface is intended to encompass each interface specifically used for a serial port, a parallel port, a game port, a keyboard port, and/or a universal serial bus (USB). A monitor 47 or other type of display device is also connected to system bus 23 via an appropriate interface, such as a video adapter 48. In addition to the monitor, personal computers are often coupled to other peripheral output devices (not shown), such as speakers (through a sound card or other audio interface—not shown) and printers.

Personal computer 20 may operate in a networked environment using logical connections to one or more remote computers, such as a remote computer 49. Remote computer 49 may be another personal computer, a server, a router, a network personal computer, a peer device, or other common network node, and typically includes many or all of the elements described above in connection with personal computer 20, although only an external memory storage device 50 has been illustrated in FIG. 1. The logical connections depicted in FIG. 1 include a local area network (LAN) 51 and a wide area network (WAN) 52. Such networking environments are common in offices, enterprise wide computer networks, intranets and the Internet.

When used in a LAN networking environment, personal computer 20 is connected to LAN 51 through a network interface or adapter 53. When used in a WAN networking environment, personal computer 20 typically includes a modem 54, or other means for establishing communications over WAN 52, such as the Internet. Modem 54, which may be internal or external, is connected to the system bus 23, or coupled to the bus via I/O device interface 46, i.e., through a serial port. In a networked environment, program modules depicted relative to personal computer 20, or portions thereof, may be stored in the remote memory storage device. It will be appreciated that the network connections shown are exemplary and other means of establishing a communications link between the computers may be used.

Comparative Samples

Figure 2A:
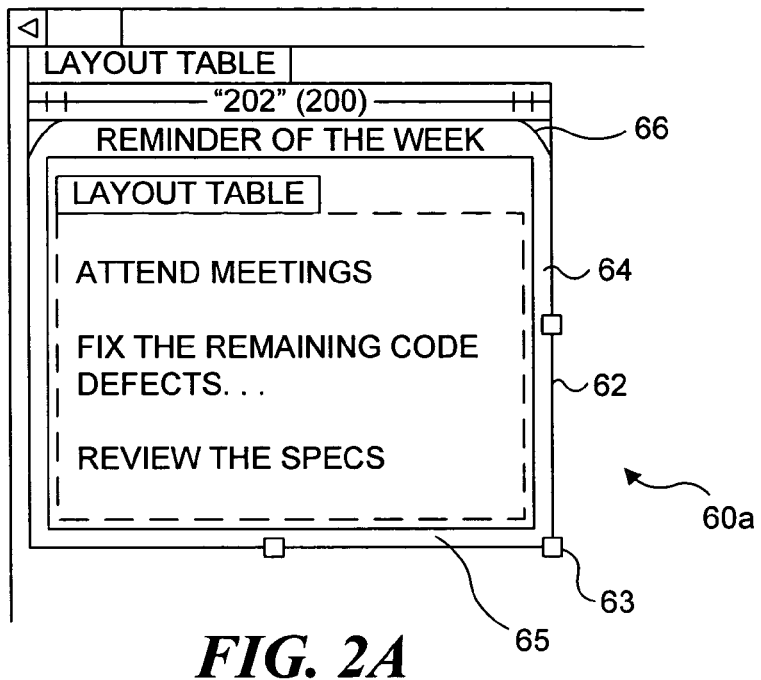
FIG. 2A is a partial screen shot of a prior art Web page design tool with a decorative layout table under construction.

FIG. 2A is a partial screen shot of a prior art Web page design tool with a decorative layout table 60a under construction. The dimensions of decorative layout table 60a are defined by a bounding box 62 that includes one or more handles, such as a handle 63, for reshaping or resizing bounding box 62. Decorative layout table 60a includes a number of decorative table cells that appear to be integrated into complete decorative elements. For example, a right border cell 64 appears integrated with a bottom border cell 65 and with a top right corner cell 66, forming an integral border. However, the prior art Web page design tool does not recognize the visual relationships among these individual cells. The individual cells simply represent data cell elements of an HTML <table> element that retain separate characteristics. For reference, the HTML code defining decorative layout table 60a is provided in Appendix A. As a result of the limitations of the HTML standards, and the prior art Web page design tool, a Web page designer must typically manipulate each individual cell to revise the visual appearance of the decorative layout table, so that the border as a whole is consistent in appearance.

Figure 2B:
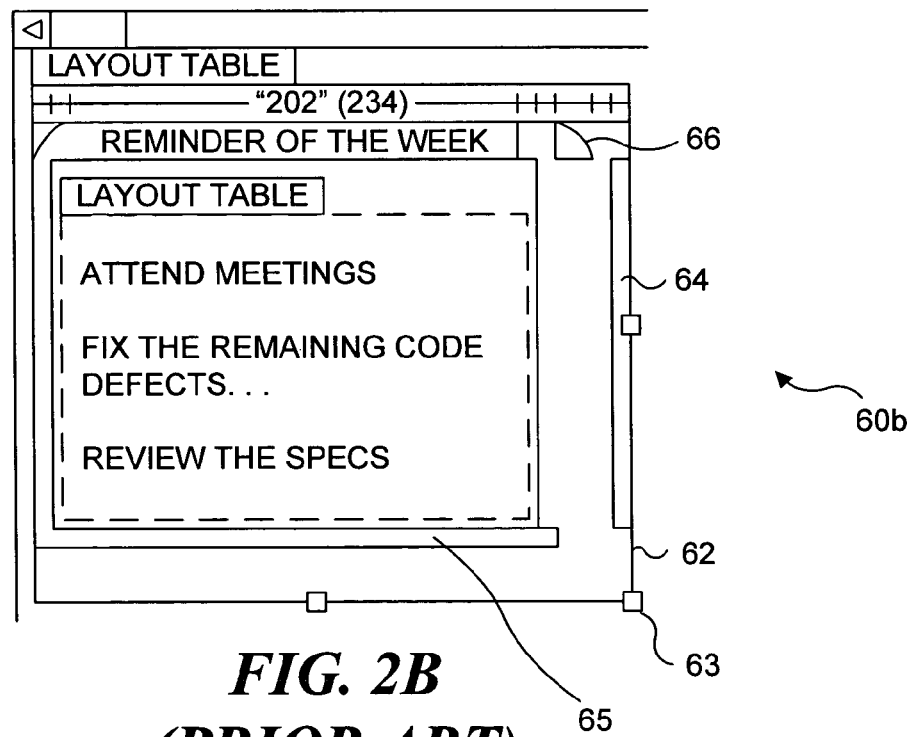
FIG. 2B is a partial screen shot of the prior art Web page design tool with a revised decorative layout table under construction.

FIG. 2B is a partial screen shot of the prior art Web page design tool with a revised decorative layout table 60b under construction. A Web page designer has resized bounding box 62 by selecting and dragging handle 63 to define a larger area for decorative layout table 60b. However, resizing bounding box 62 does not automatically result in resizing and relocating the individual cells of decorative layout table 60b. Instead, right border cell 64 was individually selected and moved to its new location shown against a right edge of bounding box 62. To make right border cell 64 appear integrated with bottom border cell 65, bottom border cell 65 must be resized to extend all the way to the right edge of bounding box 62. Similarly, top right corner cell 66 must be relocated to the right edge of bounding box 62 to appear integrated with right border cell 64. Correspondingly, other cells must be individually resized and/or relocated to make decorative layout table 60b larger, yet still appear to be visually integrated. For reference, the HTML code defining revised decorative layout table 60b is provided in Appendix B.

In contrast, FIG. 3A provides a partial screen shot of a Web page design tool incorporating a preferred embodiment of the present invention that recognizes relationships among visual regions of a visually integrated panel, wherein the regions again represent corresponding HTML table cells. FIG. 3A shows an originally sized decorative panel 70a that is in the process of being resized to expand its limits from original bounding box 72a to resized bounding box 72b. As indicated above, a Web page designer simply selects and drags a handle 73 to resize the bounding box. Also, originally sized decorative panel 70a comprises individual graphical regions corresponding to table cells that appear integrated, such as right border region 74, bottom border region 75, and top right corner region 76, but are still each separate cells. However, because the Web page design tool of the present invention recognizes relationships among regions, there is no need to manipulate individual table cells when the decorative panel is revised with the tool. Further, the corresponding HTML table code is not encumbered with additional, non-standard elements. Only a few inert comments are included in the HTML table code. For reference, the HTML code defining the table corresponding to decorative panel 70A within original bounding box 72b is provided in Appendix C.

FIG. 3B is a partial screen shot of the inventive Web page design tool, illustrating a resized decorative panel 70b that maintains its visual integration as a result of the relationships among visual regions that correspond to individual table cells. The table cells corresponding to the visual regions of decorative panel 70b have been automatically updated to reflect resized and/or relocated visual regions that fit the new dimensions of resized bounding box 72b. For instance, the table cell corresponding to right border region 74 was automatically updated in relation to relocating right border region 74 to a new right edge of resized bounding box 72b, and extending right border region 74 downward to approximately a bottom edge of resized bounding box 72b. Similarly, the table cell corresponding to bottom border region 75 was automatically updated in relation to relocating bottom border region 75 to the bottom edge of resized bounding box 72b, and extending border region 75 to approximately the right edge of resized bounding box 72b. The above automatic steps cause the table cells corresponding to right border region 74 and bottom border region 75 to maintain a visually integrated appearance, as if they indeed were all part of an integral border. Similarly, the table cell corresponding to top right corner region 76 is automatically updated to maintain a visually integrated appearance in relation to the table cell corresponding to right border region 74 after right border region 74 is automatically relocated to the right edge of resized bounding box 72b. Likewise, when the Web page designer simply selected and dragged handle 73, other table cells corresponding to other regions of originally sized panel 70a were automatically updated to reflect resizing and/or relocating of the other regions that are related as adjacent regions. Re-rendering the updated table cells produces resized panel 70b. The corresponding HTML table code was automatically revised to reflect new properties of the visual regions. The HTML code defining resized decorative panel 70b is provided in Appendix D.

Structures and Relationships

Although the automatic resizing described above may be visually intuitive, implementing such a feature is not trivial. Additional, nonstandard HTML elements could be introduced to define the relationships among visual regions. However, it is desirable to produce standard HTML (or other standard markup language code) that can readily be evaluated by conventional browsers without modification, to render HTML tables as visually integrated decorative panels. Thus, the Web page design tool incorporating a preferred embodiment of the present invention recognizes and maintains the relationships among individual panel regions while the tool is being used, but outputs standard code, such as standard HTML table elements, which will be properly interpreted by conventional browser programs. No new elements are required, and the relationships need not be explicitly defined in the output code. Instead, a few comments are embedded in the output HTML code, which will be ignored by conventional browsers, but can be used by the Web page design tool to detect portions of the HTML code that should be analyzed for panel region relationships. To facilitate recognizing and using the relationships, decorative panels are defined by a consistent logical structure.

FIG. 4 is a structure diagram illustrating a preferred predefined logical structure of a decorative panel 80. Any decorative panel may contain one or more regions illustrated in decorative panel 80. For example, the samples described with regard to FIGS. 3A and 3B included at least a content region 82, a right border region 84, a bottom border region 85, and a top right corner region 86. Any combination of regions may be filled with an image, colored, or otherwise formatted to achieve a desired appearance. The layout of regions illustrated in decorative panel 80 enable approximately 65,000 different patterns. These patterns are recognized by a knowledge base of rules that are used to detect and validate decorative panels being created and/or revised with the Web page design tool. The rules are defined as first order logic and ensure that integrated operations are only applied to HTML table cells that are intended to comprise decorative panels, and not applied to HTML table cells that are intended to comprise conventional data tables, or other tables not intended to be decorative panels.

For each decorative panel corresponding to a table of a Web page document that is loaded by the Web page design tool, the tool creates and stores in memory, a panel partition tree. Each panel partition tree comprises a hierarchical structure of nodes corresponding to the regions of the decorative panel. Thus, in general, a node of a panel partition tree corresponds to a region of a decorative panel. FIG. 5 illustrates this mapping between a sample panel partition tree 100 and a sample decorative panel 110. The nodes of panel partition tree 100 define locations and bounded areas of each panel region and of the entire sample decorative panel 110. The locations and bounded areas are defined in Web page document coordinates, and are used to define corresponding locations and dimensions of HTML table cells. More specifically, a root node 101 defines the location and bounded area of decorative panel 110 by defining the left (L), top (T), right (R), and bottom (B) edge locations in document coordinates. The coordinates will be used to define attributes of a corresponding HTML table. Nested within root node 101 is a left border node 102 that defines the location and bounded area of a corresponding left border region 112. Attributes of a table cell will be generated from left border node 102. Similarly, a table cell will be generated based on a content node 104 that defines the location and bounded area of a corresponding content region 114. A top left corner node 106 defines the location and bounded area of a corresponding top left corner region 116. A top border node 108 defines the location and bounded area of a corresponding top border region 118. Each node may have additional sub-nested nodes that define locations and bounded areas of other elements within a panel region. The document coordinates defining a region's location and bounded area can also be used to perform collision detection during dragging operations, and perform other graphical functions related to manipulating a decorative panel with a GUI of the Web page design tool.

Panel properties other than the coordinates, are created and stored in a property container. The property container is preferably a memory construct used by the Web page design tool only while a Web document is being created/modified. The panel properties are formatting characteristics of a decorative panel. A few samples of panel properties and sub-properties are listed in TABLE 1 below.

TABLE 1

Sample Panel Properties

| Property | Property ID | Description |
| --- | --- | --- |
| Width | PP_WIDTH | Width of decorative panel in pixels (derived from coordinates in panel partition tree). |
| Height | PP_HEIGHT | Height of decorative panel in pixels (derived from coordinates in panel partition tree). |
| Padding | PP_PADDING | Specifies number of pixels to pad between the edges of the content region and the content within the content region. |
| Vertical Alignment | PP_VALIGN | Specifies the vertical alignment of content in the content region. E.g., top, centered, bottom. |
| Background Color | PP_BACKGROUND_COLOR | Specifies the background color of the content region. |
| Corners | PP_CORNER_TOP_LEFT | Specifies a top left corner region in decorative panel. Sub-properties are used to specify formatting characteristics. |
| | PP_CORNER_TOP_RIGHT | Specifies a top right corner region in decorative panel. Sub-properties are used. |
| | PP_CORNER_BOTTOM_LEFT | Specifies a bottom left corner region in decorative panel. Sub-properties are used. |
| | PP_CORNER_BOTTOM_RIGHT | Specifies a bottom right corner region in decorative panel. Sub-properties are used. |
| | PP_ALL_CORNERS | Specifies that all corners are included in decorative panel. Sub-properties are used. |
| Corner Sub-properties | Sub-property ID | Description |
| On/Off | PP_CORNER_SWITCH | Turns a corner on or off. |
| Width | PP_CORNER_WIDTH | Specifies width of a corner in pixels (derived from corner node coordinates in panel partition tree). |
| Height | PP_CORNER_HEIGHT | Specifies height of a corner in pixels (derived from corner coordinates in panel partition tree). |
| Foreground Color | PP_CORNER_FOREGROUND_COLOR | Specifies foreground color of a corner. |
| Border Color | PP_CORNER_BORDER_COLOR | Specifies border color of a corner. |

TABLE 1-continued

Sample Panel Properties

| | | |
|---|---|---|
| Custom Image | PP_CORNER_CUSTOM | Enables designer to specify an image to use for a custom corner, rather than the corner image generated by the system based on the other corner sub-properties. |

If a designer creates a decorative panel with the Web page design tool while the designer is working on a Web document, the Web page design tool creates a property container in memory to store the panel properties. The Web page design tool also generates a corresponding HTML <table> element and inserts a predefined comment after the HTML <table> element. Alternatively, when an existing Web document is loaded, the Web page design tool detects decorative panels by predefined comment lines that have been included in the HTLM code. The Web page design tool then analyzes the HTML code with the rules discussed above to recognize a pattern indicating a known decorative panel structure. For each decorative panel structure that is detected from the Web document, the Web page design tool creates a property container in memory that stores formatting characteristics of the decorative panel (i.e., panel properties). Thus, the panel properties are formatting characteristics that are mapped to the HTML along with the document coordinates. Together, the panel properties of a property container and the document coordinates of a panel partition tree are mapped to HTML attributes of one or more <table> elements and corresponding cell elements of a Web document. This HTML code can be rendered by a standard browser to display a decorative panel so that it appears as intended by the designer. Examples of HTML code are illustrated in Appendices C and D.

Logic Flows

FIG. 6 is a flow diagram illustrating overall logic employed by a Web page design tool to format an HTML table of a Web document in response to a user changing a corresponding decorative panel. At a step 120 the user changes the decorative panel through the Web page design tool. The change might include adding a decorative panel, relocating or resizing the decorative panel, adding an individual region to the decorative panel, relocating or resizing a region of the decorative panel, or changing another visual property of the decorative panel. At a step 122, the Web page design tool detects a property of the decorative panel that is affected by the user change. The property might be the location of the decorative panel relative to a coordinate origin of the Web document, a size of an individual region in the decorative panel, or other visual property. Further detail is discussed below with regard to FIG. 7. At a step 124 of FIG. 6, the Web page design tool determines one or more changes required for each related panel region that is affected by the user change. This determination depends on predefined relationships among regions of the decorative panel, and affects the property container and/or partition tree defining the decorative panel. Further detail is discussed below with regard to FIGS. 7 and 8.

At a step 126 of FIG. 6, the Web page design tool generates or revises HTML table code that corresponds to each panel region that was affected by the user change. Standard HTML code is produced, but predefined comment lines are also included in the HTML code, so that the Web page design tool will recognize the HTML tables that correspond to decorative panels and recognize corresponding properties. Optionally, the user can directly modify the HTML table code, at a step 127. In either case, the HTML code is considered "damaged" by the Web page design tool. Thus, at a step 128, the Web page design tool reevaluates the whole Web document relative to a knowledge base of inference rules to determine whether the HTML table code still validly defines decorative panels. If the HTML table code does not sufficiently conform to the knowledge base rules, the decorative panel is considered broken, so that further changes will affect the individual table cells in a conventional manner, rather than in an integrated manner. Further detail regarding this validation process, is discussed below with regard to FIG. 10.

Further detail is now provided regarding the detecting of a changed property. The following discussion relates to steps 120 and 122 of FIG. 6. FIG. 7 is a flow diagram illustrating the logic for detecting a changed property of a decorative panel. At a step 130, the user may change the decorative panel with a GUI of the Web page design tool. Alternatively, the user may change script code (e.g., Visual Basic script code) at a step 132, wherein the script code corresponds to the decorative panel within the working environment of the Web page design tool. As indicated above, examples of changes include adding a region to the decorative panel, selecting a background color for a region, resizing a region, and any other visual change. A document object model (DOM) of the Web page design tool identifies a region affected by the user's change, at a step 134. At a step 136, the DOM identifies one or more properties of the region that are affected by the user's change. For example, the DOM can determine a height and width of a bounding box that the user resized in order to instruct the Web page design tool to resize a selected region of the decorative panel. At a step 138, a panel region identifier (ID), one or more property IDs, and corresponding value(s) are communicated to a property explorer interface module of the Web page design tool for changing the property container of the decorative panel.

FIG. 8 is a flow diagram illustrating the logic for determining changes required to the property container and partition tree for each panel region that is affected by the user's change. FIG. 8 shows additional details of step 124 in FIG. 6. At a step 140 of FIG. 8, the property explorer interface module sets one or more properties in a property container 142 that correspond to the graphical region and property identified by the DOM. Preferably, a property container stores properties of one decorative panel. Thus, multiple property containers may be related to a Web page with multiple decorative panels. If a new region was added to a decorative panel, the DOM stores the new property in the decorative panel property container. If a property of an existing decorative panel was changed, the corresponding property container is changed, but the original property value is saved, along with the new property value, at least until the HTML table for the decorative panel is validated, as discussed below.

Once the property container is changed, a panel manager module detects the new or changed property value, at a step 144. At a decision step 146, the property manager module determines whether the change to the property container indicates that a region was added, deleted, relocated, or resized. The change may also indicate that the entire decorative panel was relocated or resized. Each of these changes affects the coordinates of the region or of the entire decorative panel. Thus, if one of these type of changes occurred, the Web page design tool changes the coordinates in the partition tree defining the location and bounding area of a changed region or of the entire decorative panel, at a step 148. Further details regarding changing the partition tree are discussed below with regard to FIG. 9. However, if only a static visual property was changed, such as a background color, the new property value is already incorporated into the property container, and the partition tree need not be changed.

FIG. 9 is a flow diagram illustrating the logic for changing the coordinates in the partition tree defining the location and bounding area of a changed region or of the entire decorative panel. FIG. 9 provides further detail of step 148 in FIG. 8 and step 124 in FIG. 6. At a step 150 of FIG. 9, the panel manager module instantiates a panel construct object to change the partition tree to reflect the user's change to the decorative panel. For example, if the user added a region, the panel construct object will add a corresponding node to the partition tree and set the coordinates. Conversely, if the user deleted a region, the panel construct object will delete the corresponding node from the partition tree. Alternatively, if the user relocated or resized a region, the panel construct object will change the coordinates of the corresponding node. To implement these changes, the panel construct object first accesses the existing partition tree, at a step 152. At a step 154, the panel construct object determines which partition tree nodes are affected by the user's change. Preferably, the panel construct object determines affected nodes based on the predefined relationships among regions of a decorative panel, as illustrated in FIG. 4. However, those skilled in the art will recognize that the panel construct object could evaluate the coordinates of each node to identify any node that is located adjacent to the changed node, or to determine any node that has an edge affected by a change to an edge of the entire decorative panel.

After determining affected nodes, the panel construct object changes the panel partition tree at a step 156. For example, if the user added a region, the panel construct object adds a node to the partition tree and sets the coordinates for the new node based on the location and dimensional properties of the added region. The panel construct object also changes the coordinates of nodes that were determined to be adjacent to the added region. This might include changing the coordinates of an adjacent node to reflect a wider adjacent region, so as to accommodate the added region within the decorative panel. Alternatively, the panel construct object can change the coordinates of the adjacent node to reflect a different location for the adjacent region, and change the coordinates of a content node to reflect a wider content region. To make coordinate changes, the panel construct object can obtain width, height, or other properties from the property container.

Once the affected nodes of the partition tree are changed, preparations can be made to revise the corresponding HTML code. If a new region was added to the decorative panel and a corresponding new node was added to the partition tree, the panel construct object can simply add a corresponding HTML cell element to the table. Thus, at a decision step 158, the panel construct object determines whether one or more new nodes were added to the partition tree. If a node was added, the panel construct object creates an HTML cell element at a step 160 for the table element in the Web document. The panel construct object may also insert a post comment to identify the new region to which the new cell element corresponds.

At a step 162, control then returns to the panel manager, which accesses the coordinate values in the partition tree resulting from the panel construct object. The panel manager computes attribute values such as height and/or width that are needed to generate or revise cell elements of the table or to revise the table element. As discussed above, the HTML table code is then generated or revised (at a step 126 of FIG. 6), depending on the user change.

Once the HTML table code is generated or revised, all tables of the Web document are evaluated to ensure that any added or revised tables still conform to one of the predetermined patterns for a decorative panel. Alternatively, the user can directly revise the HTML and trigger the validation process. FIG. 10 is a flow diagram illustrating the logic for validating tables of a Web document. At a step 170, the Web page design tool generates HTML code if the user has created a new Web document, or regenerates the HTML code if the user has revised an existing Web document. This is sometimes referred to as performing a two-dimensional (2D) layout of the entire Web document. HTML elements are "laid out" relative to each other within the Web document. This layout process can determine interferences with non-table elements of the Web document and affect the hierarchical structure or coordinates of the partition tree. Thus, at a step 172, the panel manager evaluates the generated or regenerated HTML code, and updates the nodes of the partition tree.

At a step 174, the panel manager searches the HTML code for a predefined comment identifying a table that defines to a decorative panel. When a predefined comment is found, an inference engine evaluates the cell elements of the table against the predefined inference rules, at a step 176. More specifically, the inference engine uses first order logic to infer whether the cell elements correspond to a predefined pattern, which is recognized for a valid decorative panel. At a decision step 180, the inference engine evaluates the rules relative to the cell elements to determine whether a matching pattern was found. If the cell elements correspond to one of the predefined patterns, the panel manager updates the property container at a step 182 to ensure that all of the properties for a decorative panel matching the found pattern are accurate in the property container. However, if the cell elements of the table do not match any of the predefined patterns, the table is marked as broken at a step 184. Preferably, the corresponding table node in the partition tree is flagged so that the Web page design tool will no longer allow dynamic, integrated formatting for that table, which prevents unpredictable results and ensures a consistent experience for the user. At a decision step 186, the panel manager determines whether another table element exists in the Web document. If the Web document includes another table, control returns to step 176 to determine whether this other table matches a predefined pattern. When all tables of the Web document have been evaluated, control returns to a main control module of the Web design tool to await another user action.

Although the present invention has been described in connection with the preferred form of practicing it, those of ordinary skill in the art will understand that many modifications can be made thereto within the scope of the claims that follow. For example, regions of a decorative panel may comprise shapes other than rectangles to correspond to non-rectangular Web document elements. Accordingly, it is not intended that the scope of the invention in any way be limited by the above description, but instead be determined entirely by reference to the claims that follow.

APPENDIX A

HTML Code for FIG. 2A (Prior Art)
Before Resizing Layout Table

```
<table cellpadding="0" cellspacing="0" width="220" height="155">
    <!-- MSCellFormattingTableID="1" -->
    <tr>
        <td rowspan="2" colspan="2">
        <img alt=""src="MsoPnl_Cnr_tl_18.gif" width="10" height="22"></td>
```

APPENDIX A-continued

HTML Code for FIG. 2A (Prior Art)
Before Resizing Layout Table

```
            <td bgcolor="#006699" height="2">
            <img alt="" width="1" height="2"
src="MsSpacer.gif"></td>
            <td rowspan="2" colspan="2">
            <img alt="" src="MsoPnl_Cnr_tr_1A.gif" width="10"
height="22"></td>
        </tr>
        <tr>
            <td bgcolor="#006699" nowrap height="20">
            <!-- MSCellFormattingType="header" -->
            <b><font face="Arial" color="#FFFFFF">Reminder of
the week</font></b></td>
        </tr>
        <tr>
            <td bgcolor="#006699">
            <img alt="" width="2" height="1"
src="MsSpacer.gif"></td>
            <td bgcolor="#C4ECFF" colspan="3">
            <!-- MSCellFormattingType="content" -->
            <table border="0" width="100%" height="100%"
cellpadding="10" cellspacing="0">
                <tr>
                    <td width="100%" height="100%"
valign="top">Attend meetings<p>
                        Fix the remaining code defects... </p>
                        <p>Review the specs</td>
                    </tr>
            </table>
            </td>
            <td bgcolor="#006699" height="130">
            <img alt="" width="2" height="1"
src="MsSpacer.gif"></td>
        </tr>
        <tr>
            <td bgcolor="#006699" colspan="5" height="2">
            <img alt="" width="1" height="2"
src="MsSpacer.gif"></td>
        </tr>
        <tr>
            <td width="2"><img alt="" width="2" height="1"
src="MsSpacer.gif"></td>
            <td width="8"><img alt="" width="8" height="1"
src="MsSpacer.gif"></td>
            <td width="200"><img alt="" width="200" height="1"
src="MsSpacer.gif"></td>
            <td width="8"><img alt="" width="8" height="1"
src="MsSpacer.gif"></td>
            <td height="1" width="2">
            <img alt="" width="2" height="1"
src="MsSpacer.gif"></td>
        </tr>
    </table>
```

APPENDIX B

HTML Code for FIG. 2B (Prior Art)
After Resizing Layout Table

```
<table cellpadding="0" cellspacing="0" width="301"
height="155">
    <!--DWLayoutTable-->
    <!-- MSCellFormattingTableID="1" -->
    <tr>
        <td rowspan="2" colspan="2"> <img alt=""
src="MsoPnl_Cnr_tl_18.gif" width="10" height="22"></td>
        <td bgcolor="#006699" height="2"> <img alt="" width="1"
height="2" src="MsSpacer.gif"></td>
        <td width="6"></td>
        <td width="1"></td>
        <td width="32"></td>
        <td width="8" rowspan="2" valign="top"> <img alt=""
src="MsoPnl_Cnr_tr_1A.gif" width="10" height="22"></td>
        <td width="1"></td>
```

APPENDIX B-continued

HTML Code for FIG. 2B (Prior Art)
After Resizing Layout Table

```
    </tr>
    <tr>
        <td bgcolor="#006699" nowrap height="20">
        <!-- MSCellFormattingType="header" -->
        <b><font face="Arial" color="#FFFFFF">Reminder of the
week</font></b></td>
        <td></td>
        <td>&nbsp;</td>
        <td></td>
        <td></td>
    </tr>
    <tr>
        <td height="152" bgcolor="#006699"> <img alt="" width="2"
height="1"src="MsSpacer.gif"></td>
        <td bgcolor="#C4ECFF" colspan="3">
        <!-- MSCellFormattingType="content" -->
        <table border="0" width="100%" height="100%"
cellpadding="10" cellspacing="0">
            <tr>
                <td width="100%" height="100%" valign="top">Attend
meetings <p> Fix
                    the remaining code defects...</p>
                    <p>Review the specs</td>
                </tr>
        </table></td>
        <td>&nbsp;</td>
        <td>&nbsp;</td>
        <td>&nbsp;</td>
        <td valign="top" bgcolor="#006699"> <img alt="" width ="2"
height="1" src="MsSpacer.gif"></td>
    </tr>
    <tr>
        <td bgcolor="#006699" colspan="5" height="2"> <img alt=""
width="1" height="2" src="MsSpacer.gif"></td>
        <td ></td>
        <td ></td>
        <td ></td>
    </tr>
    <tr>
        <td width="2" height="1"><img alt="" width="2" height="1"
src="MsSpacer.gif"></td>
        <td width="8"><img alt="" width="8" height="1"
src="MsSpacer.gif"></td>
        <td width="200"><img alt="" width="200" height="1"
src="MsSpacer.gif"></td>
        <td><img alt="" width="8" height="1"
src="MsSpacer.gif"></td>
        <td> <img alt="" width="2" height="1"
src="MsSpacer.gif"></td>
        <td></td>
        <td></td>
        <td></td>
    </tr>
    <tr>
        <td height="79"></td>
        <td></td>
        <td></td>
        <td></td>
        <td></td>
        <td></td>
        <td></td>
        <td></td>
    </tr>
</table>
```

APPENDIX C

HTML Code for FIG. 3A
Before Resizing Panel

```
<table cellpadding="0" cellspacing="0" width="220" height="155">
    <!-- MSCellFormattingTableID="1" -->
    <tr>
```

APPENDIX C-continued

HTML Code for FIG. 3A
Before Resizing Panel

```
        <td rowspan="2" colspan="2">
        <img alt="" src="MsoPnl_Cnr_tl_18.gif" width="10"
height="22"></td>
        <td bgcolor="#006699" height="2">
        <img alt="" width="1" height="2"
src="MsSpacer.gif"></td>
        <td rowspan="2" colspan="2">
        <img alt="" src="MsoPnl_Cnr_tr_1A.gif" width="10"
height="22"></td>
    </tr>
    <tr>
        <td bgcolor="#006699" nowrap height="20">
        <!-- MSCellFormattingType="header" -->
        <b><font face="Arial" color="#FFFFFF">Reminder of
the week</font></b></td>
    </tr>
    <tr>
        <td bgcolor="#006699">
        <img alt="" width="2" height="1"
src="MsSpacer.gif"></td>
        <td bgcolor="#C4ECFF" colspan="3">
        <!-- MSCellFormattingType="content" -->
        <table border="0" width="100%" height="100%"
cellpadding="10"cellspacing="0">
            <tr>
                <td width="100%" height="100%"
valign="top">Attend meetings<p>
                    Fix the remaining code defects... </p>
                    <p>Review the specs</td>
                </tr>
            </table>
        </td>
        <td bgcolor="#006699" height="130">
        <img alt="" width="2" height="1"
src="MsSpacer.gif"></td>
    </tr>
    <tr>
        <td bgcolor="#006699" colspan="5" height="2">
        <img alt="" width="1" height="2"
src="MsSpacer.gif"></td>
    </tr>
    <tr>
        <td width="2"><img alt="" width="2" height="1"
src="MsSpacer.gif"></td>
        <td width="8"><img alt="" width="8" height="1"
src="MsSpacer.gif"></td>
        <td width="200"><img alt="" width="200" height="1"
src="MsSpacer.gif"></td>
        <td width="8"><img alt="" width="8" height="1"
src="MsSpacer.gif"></td>
        <td height="1" width="2">
        <img alt="" width="2" height="1"
src="MsSpacer.gif"></td>
    </tr>
</table>
```

APPENDIX D

HTML Code for FIG. 3B
After Resizing Panel

```
<table cellpadding="0" cellspacing="0" width="280"
height="215">
    <!-- MSCellFormattingTableID="1" -->
    <tr>
        <td rowspan="2" colspan="2">
        <img alt="" src="MsoPnl_Cnr_tl_18.gif" width="10"
height="22"></td>
        <td bgcolor="#006699" height="2">
        <img alt="" width="1" height="2"
src="MsSpacer.gif"></td>
        <td rowspan="2" colspan="2">
        <img alt="" src="MsoPnl_Cnr_tr_1A.gif" width="10"
```

APPENDIX D-continued

HTML Code for FIG. 3B
After Resizing Panel

```
height="22"></td>
    </tr>
    <tr>
        <td bgcolor="#006699"nowrap height="20">
        <!-- MSCellFormattingType="header" -->
        <b><font face="Arial" color="#FFFFFF">Reminder of
the week</font></b></td>
    </tr>
    <tr>
        <td bgcolor="#006699">
        <img alt="" width="2" height="1"
src="MsSpacer.gif"></td>
        <td bgcolor="#C4ECFF" colspan="3">
        <!-- MSCellFormattingType="content" -->
        <table border="0" width="100%" height="100%"
cellpadding="10" cellspacing="0">
            <tr>
                <td width="100%" height="100%"
valign="top">Attend meetings<p>
                    Fix the remaining code defects... </p>
                    <p>Review the specs</td>
                </tr>
            </table>
        </td>
        <td bgcolor="#006699" height="190">
        <img alt="" width="2" height="1"
src="MsSpacer.gif"></td>
    </tr>
    <tr>
        <td bgcolor="#006699" colspan="5" height="2">
        <img alt="" width="1" height="2"
src="MsSpacer.gif"></td>
    </tr>
    <tr>
        <td width="2"><img alt="" width="2" height="1"
src="MsSpacer.gif"></td>
        <td width="8"><img alt="" width="8" height="1"
src="MsSpacer.gif"></td>
        <td width="260"><img alt="" width="260"
height="1" src="MsSpacer.gif"></td>
        <td width="8"><img alt="" width="8" height="1"
src="MsSpacer.gif"></td>
        <td height="1" width="2">
        <img alt="" width="2" height="1"
src="MsSpacer.gif"></td>
    </tr>
</table>
```

The invention in which an exclusive right is claimed is defined by the following:

1. In a computing environment wherein decorative panels are displayed using cells of software tables, wherein cells of software tables have at least one of attributes of the individual cells specified or images displayed in the cells such that a plurality of cells of software tables appear as a single unit forming at least a portion of a decorative panel, a method of automatically updating at least one of attributes of individual cells or images in individual cells to change the appearance of a decorative panel, the method comprising:

displaying a decorative panel by displaying cells of a software table, wherein the software table comprises HTML table code, where cells of the software table spatially correspond to spatial regions of the decorative panel, and wherein displaying a software table is performed such that cells of the software table are displayed as a single unit forming at least a portion of the decorative panel, by displaying cells with at least one of attributes specified for a cell, or images in cells displayed to form a single unit;

receiving user input specifying a change in the appearance of the decorative panel;

mapping changes in the appearance of the decorative panel to cells in the software table;

automatically revising at least one of attributes of cells or images in cells, without a user needing to manipulate individual cells, to correspond to the changes in the appearance of the decorative panel; and evaluating the HTML table code against predetermined inference rules to determine if the HTML table code corresponds to a predefined pattern recognized as a valid decorative panel.

2. The method of claim 1, wherein receiving user input comprises receiving input from a graphical user interface.

3. The method of claim 1, wherein receiving user input comprises receiving input from a script code.

4. The method of claim 1, wherein receiving user input comprises receiving user input specifying at least one of adding a Previously Presented decorative panel, relocating the decorative panel, resizing the decorative panel, adding an individual region to the decorative panel, relocating a region of the decorative panel or resizing a region of the decorative panel.

5. The method of claim 1, wherein automatically revising attributes of the cells comprises automatically revising the HTML table code.

6. The method of claim 1, wherein automatically revising attributes of the cells comprises automatically generating the HTML table code.

7. The method of claim 1, wherein the method is performed by a Web page design tool, the method further comprising generating predefined comment lines usable by the Web page design tool such that the Web page design tool recognizes the HTML table code as corresponding to decorative panels.

8. The method of claim 1, further comprising, if the HTML table code no longer corresponds to a predefined pattern recognized as a valid decorative panel then indicating that the HTML table code is broken.

9. The method of claim 1, further comprising generating or revising a panel partition tree, wherein the panel partition tree comprises a hierarchical structure of nodes corresponding to regions of the decorative panel.

10. The method of claim 9, wherein the nodes of the panel partition tree defines bounded areas of regions by Web page document coordinates.

11. The method of claim 1, wherein elements displayed in a software table comprises images.

12. A system for automatically updating a software table used for displaying a decorative panel, the system comprising:

a processor;

a display in communication with the processor;

a memory in communication with the processor and storing computer executable instructions that cause the processor to perform the following:

display a decorative panel by displaying cells of a software table, where cells of the software table spatially correspond to spatial regions of the decorative panel, and wherein displaying a software table is performed such that cells of the software table are displayed as a single unit forming at least a portion of the decorative panel, by displaying cells with at least one of attributes specified for a cell, or images in cells displayed to form a single unit;

receive user input specifying a change in the appearance of the decorative panel;

map changes in the appearance of the decorative panel to cells in the software table;

automatically revise at least one of attributes of cells or images in cells, without a user needing to manipulate individual cells, to correspond to the changes in the appearance of the decorative panel; and generate or revise a panel partition tree, wherein the panel partition tree comprises a hierarchical structure of nodes corresponding to regions of the decorative panel, wherein the nodes of the panel partition tree defines bounded areas of regions by Web page document coordinates.

* * * * *